Patented May 30, 1950

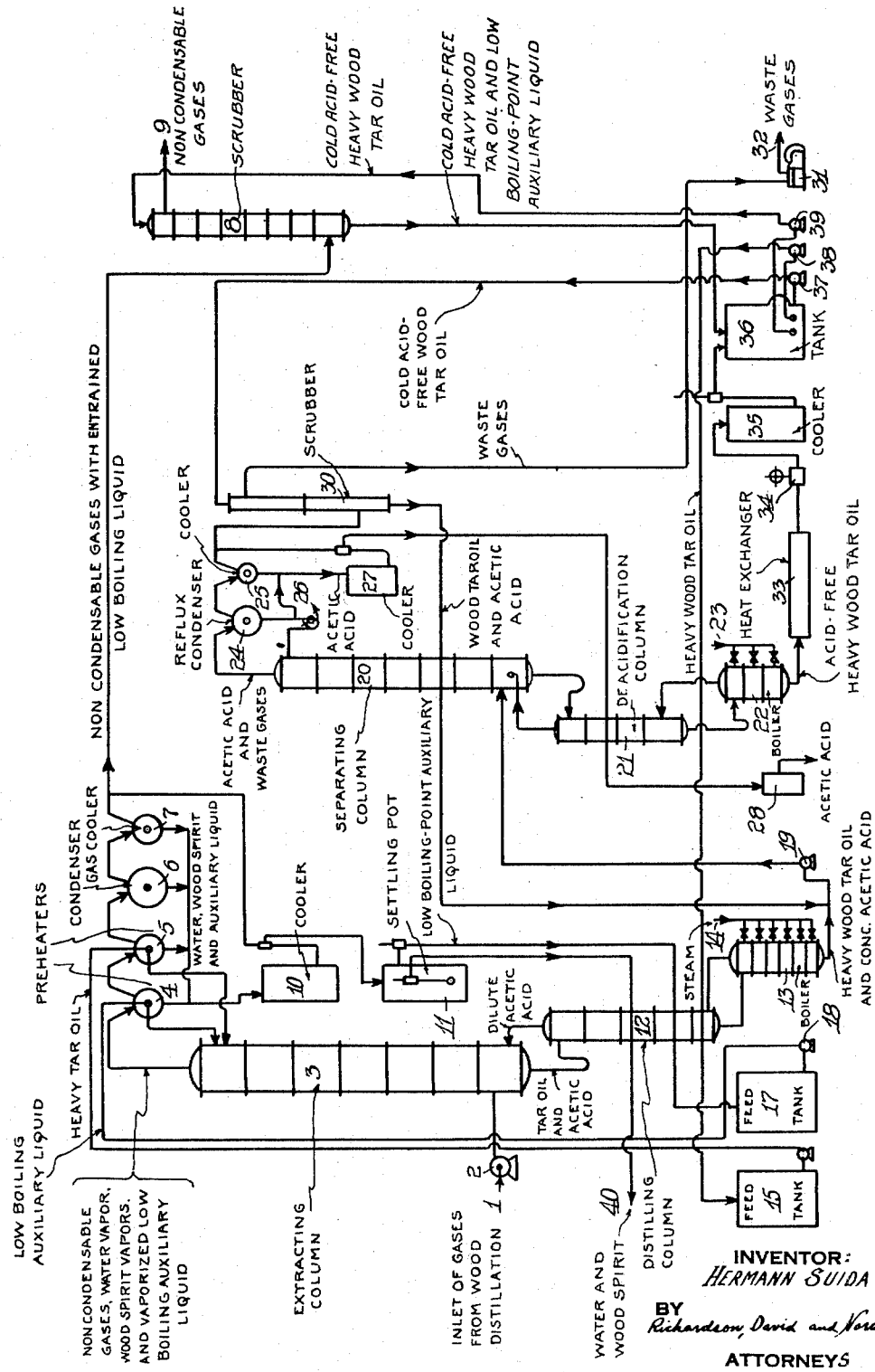

2,509,539

UNITED STATES PATENT OFFICE 2,509,539

DIRECT RECOVERY OF CONCENTRATED ACETIC ACID FROM WOOD DISTILLATION VAPORS

Hermann Suida, Salzburg, Austria

Application July 17, 1948, Serial No. 39,316
In Austria May 7, 1947

4 Claims. (Cl. 202—67)

The extraction of acetic acid directly from the hot gases and vapours resulting from the distillation of wood by means of heavy wood tar oils is known. So is the use of azeotropic mixtures of water, and low boiling point liquids, not mixable with water, for the concentration of diluted acetic acids, but this process has never been described or realized in the presence of non-condensable gases, and/or in direct application to the vapour and gas mixture of wood distillation.

The extraction of acetic acid, when carried out according to either of the above processes calls for a considerable reflux in the extraction or washing column (tower) for discharging the heat of condensation of the acetic acid released, and for draining a part of the water. The reason is that when washing the vapours and gases of the distillation of the wood by means of heavy wood tar oil the acetic acid is but concentrated to about the double i. e. at least one half of the water present is entrained and involved in the process of condensation, running together with the extracted acetic acid and the heavy wood tar oil into the distilling column (tower) arranged below the extracting column (tower) in which the acid is rectified to 80–90%, but dissolved in the wood tar oil, and finally discharged together with the wood tar oil in a hot state into a decomposition plant. The same considerations apply—mutatis mutandis—to the concentration of aqueous acetic acid by means of low boiling point liquids forming with water an azeotropic mixture. The voluminous aqueous reflux in the extracting column (tower) which must be produced by a condenser, as well as the heat consumed for the evaporation of the respective quantities are without avail for the proper purpose of the extraction in the extracting column (tower), additionally and superfluously loading the apparatus, and reducing the thermic efficiency of the entire process.

However, by employing—in addition to the extraction oil—a low boiling point auxiliary liquid, forming together with water a lower boiling point azeotropic mixture, the production of an aqueous reflux is quite superfluous, provided that the quantity of the auxiliary liquid is so determined in proportion to the extraction oil and to the acetic acid-water vapour mixture that by its evaporation in the extracting column (tower) the superfluous heat is just consumed, and that on the top of the extracting column (tower) the temperature is attained and maintained which is the condition for the complete retention of the acetic acid by the heavy tar oil.

But this combination is not a simple substitute for an aqueous reflux, considering that the auxiliary liquid causes, per se, a separation of the acetic acid and the water. In consequence, thereof, a substantially higher concentration of the acetic acid is found at the bottom of the extracting column (tower) below the inlet for the vapours and gases of the wood distillation freed from tar, than is found when the heavy wood tar oil is applied alone.

Indeed the two processes give rise to an effect which is higher than the arithmetical mean of the two individual processes.

In this case the concentration of the acetic acid dissolved in the oil of extraction is at least by three or four times higher than in the vapour and gas mixture inflowing.

As the entire consumption of heat of each rectification solely depends on the relation of the concentration of the substances to be separated in the vapour phase and in the liquid phase at that point of the apparatus at which the original mixture flows in, this process signifies a considerable reduction of the heat consumption. Besides, in the rectification column (tower) below the extracting column (tower) acetic acid of the highest concentration of 95–98% dissolved in heavy wood tar oil can be produced, which mixture is—in a manner known—decomposed in oil-free concentrated acetic acid, and in acid-free heavy wood tar oil in a decomposition apparatus.

The condition for this process being successful is that the low boiling point auxiliary liquid is almost completely evaporated in the extracting column (tower) so that no perceptible quantities do reach the distilling column (tower).

A further condition is that the auxiliary liquid in certain quantity entrained by the non-condensable gases in the form of vapours, even after a most energetic cooling of these gases, should be completely recoverable without the use of a new substance.

This aim is but achieved by scrubbing the non-condensing gases with the entire quantity of cold heavy wood tar oil, resulting from the process after the separation of the acetic acid and the cooling, this scrubbing being carried out in a counter-flow scrubber after the condensation of the water, of the main portion of the wood spirit parts, and of the main portion of the auxiliary liquid, and after having cooled down the gases to a low temperature. The cold heavy wood tar oil almost completely absorbs and extracts the parts of the low boiling point auxiliary liquid entrained and carried along by the gases. The heavy wood tar oil discharged from the washer in a cold state, and containing the balance of the auxiliary liquid, is gratuitously preheated during the process in a heat exchanger, and is—without separation—directly reintroduced on top of the extracting column (tower). At the temperature prevailing in the extracting column (tower), the heavy wood tar oil in the presence of water vapours (steam) almost completely releases the parts of the auxiliary liquid dissolved. However, said liquid is to meet the requirement mentioned.

The heavy wood tar oil is a natural wood tar distillate having a boiling range of about 170–230° C., and a contents of phenols of about 50–70%.

As auxiliary liquid one of the following substances may be used: Wood spirit oil characterized by a boiling range of 90–110° C., which however must not contain any constituent parts of a higher boiling point; propyl-, butyl-, isobutyl-, amyl-acetate; methyl-ester of the propionic-, butyric- and valerianic-acids; and benzole hydrocarbons of the boiling point range 80–110° C.

The relative quantities of heavy wood tar oil, and low boiling point auxiliary liquid depend on the proportion acetic acid/water, and on the heat of evaporation of the low boiling point auxiliary liquid i. e. they vary according to the conditions of carbonization.

In general 1.5–2 parts of the heavy tar oil to 1 part of condensable, diluted wood acetic acid, and to 2–2.5 parts of the auxiliary liquid are sufficient for the process.

This process requires the least quantity of heat among all the processes known serving the same end.

The diagram annexed shows an embodiment of the process by way of examples.

At 1 the vapour and the gas mixture—freed from tar by passing through an efficient separator—arrive at a temperature of about 105° C., and is by a blower 2 forced through the following apparatus. However, the blower may also be set up after the condensers and coolers 4—7, or after the washer 8. In case of the embodiment shown in the diagram the extracting column (tower) 3 operates at a pressure above atmospheric; in the other cases at a pressure below atmospheric, which feature is fundamentally irrelevant for the process, and only necessitates different temperatures in the extracting column (tower).

The mixture of vapours and gases flows through the extracting column (tower) 3, at whose top preheated heavy wood tar oil is introduced from the heat exchanger 5, and preheated low-boiling point auxiliary liquid is supplied by the heat exchanger 4, said heavy tar oil effecting a complete retention of the acetic acid. The heat balance obtained in the extracting column (tower) 3 causes, under standard pressure, a head temperature of about 90–92° C. in the presence of gases without a regulation by an aqueous reflux being necessary. Of course, an excellent thermic insulation is provided on the extracting column (tower).

The vapours and gases freed from acetic acid flow in succession through the heat exchangers 4 and 5, and through the condenser 6. There the bulk of the water and wood spirit vapours and of the low boiling point auxiliary liquid is condensed. In the following unit i. e. the gas cooler the non-condensing gas is cooled and a further portion of the vapour balance is condensed. The hot condensates from 4 to 7 flow into the coils of the cooler 10 where they are cooled down to the temperature required f. i. 50° C. This liquid is separated in the separator 11 (Florentine bottle) into water containing wood spirit, and low boiling point auxiliary liquid. The water containing wood spirit flows off at 40 whilst the auxiliary liquid runs into the tank 17.

The non-condensable wood gases discharged from 7 flow through the scrubber 8 in which the portion of the low boiling point auxiliary liquid is completely absorbed and extracted by cold, acid-free, heavy wood tar oil. At 9 the gases flow to the wood spirit scrubber.

From the bottom of the extracting column 3 the heavy wood tar oil loaded with acetic acid and water flows into the distilling column (tower) 12. If the proportion acetic acid/water in the mixture inflowing at 1 had e. g. been 1/9, the proportion at the outlet of the extracting column (tower) is at least 4/6. In the distilling column (tower) by means of the boiler 13 a rectification up to at least 95% is carried out. The weak (i. e. low concentration) acetic acid returns, as vapour from below into the extracting column (tower). The boiler 13 is in this case a multistage coil boiler heated by steam from 14.

The extract (heavy wood tar oil and highly concentrated acetic acid) is by a pump 19 delivered to e. g. a vacuum apparatus 20—27. Numeral 20 designates a rectification column (tower) for the complete separation of the wood tar oils, 21 a column (tower) for the complete de-acidation of the wood tar oil, 24 a reflux condenser, 26 the cock for regulating the reflux, 25 a balance condenser and gas cooler, 27 the acetic acid cooler, 22 the coil boiler, which is supplied with steam from 23. At 30 the waste gases are washed with a small quantity of cold, acid-free wood tar oil for recovering the acetic acid entrained in the form of vapours. The small quantity recuperated is again returned for separation. 33 is a heat exchanger in which e. g. wood spirit water is, before de-spiriting, preheated to boiling temperature. 34 is a suction pump for the hot, acid-free wood tar oil, 35 a coil cooler for the final cooling of the acid-free wood tar oil, which is then forced into the tank 36. From same the small pump 37 forces and delivers some oil to the scrubber 30, and the pump 39 the entire oil several times to the wood gas scrubber 8. The pump 38 delivers the cold heavy wood tar oil resulting from the process into the container 15. Thence the pump 16 forces the correct quantity of the heavy wood tar oil through the preheater 5 to the extracting column (tower) 3.

The bulk of the auxiliary liquid collected in the tank 17 is by the pump 18 and through the preheater 4 likewise forced on to the top of the extracting column (tower) 3. 31 is a standard vacuum pump for the decomposition apparatus, 32 its exhaust. The concentrated acetic acid flows from the cooler 27 into a barometric vessel 28 and at 29 into the collecting vessel.

What I claim is:

1. A process for the direct separation of acetic acid of highest concentration from a tar-free mixture of vapors and non-condensable gases resulting from the distillation of wood, comprising passing the mixture of gases upwardly through an extracting column counter-currently to preheated streams of a heavy wood tar oil having a boiling range between 170° and 230° C. and a percentage of phenols ranging between 50 and 70% and a low boiling point auxiliary liquid selected from the group consisting of wood spirit oils with a boiling range of 90° to 110° C.; propyl-, butyl-, isobutyl- and amyl-acetate; methyl esters of propionic-, butyric- and valerianic-acids; and benzol hydrocarbons with a boiling range of 80° to 110° C., whereby the acetic acid is completely extracted by the heavy wood tar oil and whereby the auxiliary liquid is completely evaporated and passes from the column together with the non-condensable gases present as a lower boiling point azeotropic mixture, the quantity of said auxiliary liquid being added to the extracting column being in such a proportion to the heavy wood tar oil and to the mixture of gases added that the heat given off by the condensation of the acetic acid and a part of the water extracted is sufficient to completely vaporize the said auxiliary liquid so that a temperature is maintained at the top of the column which is optimum for the complete extraction of the acetic acid by the wood tar oil, distilling the wood tar oil-acetic acid-water extract to obtain a concentrated acetic acid-wood tar oil liquid, the vapors of water and dilute acetic acid being distilled therefrom, separating the concentrated acetic acid from the wood tar oil, condensing the bulk of the water and auxiliary liquid from the non-condensable gases in the mixture of gases leaving the extracting column, separating the water from the auxiliary liquid, recycling the auxiliary liquid to the extracting column, scrubbing the non-condensable gases from which the bulk of the auxiliary liquid has been separated with the heavy wood tar oil which has been separated from the concentrated acetic acid so as to remove the balance of auxiliary liquid entrained in the said gases, and recycling the acid-free wood tar oil to the extracting column.

2. A process in accordance with claim 1 wherein the vapors of water and dilute acetic acid distilled from the wood tar oil-acetic acid-water extract are returned to the extracting column.

3. A process in accordance with claim 1 wherein the concentrated acetic acid is separated from the wood tar oil by distillation, the wood tar oil passing out at the bottom of the distillation apparatus and the acetic acid and waste gases passing out at the top of the apparatus, the acetic acid is separated from the waste gases by condensation, and the waste gases passing from the condensation step are scrubbed by a portion of the heavy wood tar oil which has been separated from the concentrated acetic acid so as to remove the balance of the acetic acid entrained in the said waste gases.

4. A process in accordance with claim 1 wherein the concentrated acetic acid is separated from the wood tar oil by distillation, the wood tar oil passing out at the bottom of the distillation apparatus and the acetic acid and waste gases passing out at the top of the apparatus, the acetic acid is separated from the waste gases by condensation and the waste gases passing from the condensation step are scrubbed by a portion of the heavy wood tar oil which has been separated from the concentrated acetic acid so as to remove the balance of the acetic acid entrained in the said waste gases.

HERMANN SUIDA.

REFERENCES CITED

The following references are of record in the file of this patent:

UNITED STATES PATENTS

| Number | Name | Date |
|---|---|---|
| 1,477,076 | Piron | Dec. 11, 1923 |
| 1,621,441 | Suida | Mar. 15, 1927 |
| 1,668,380 | Ricard | May 1, 1928 |
| 1,697,738 | Suida | Jan. 1, 1929 |
| 1,703,020 | Suida | Feb. 19, 1929 |
| 1,715,313 | Suida | May 28, 1929 |
| 1,766,404 | Schwaebel et al. | June 24, 1930 |
| 1,815,802 | Schleicher | July 21, 1931 |
| 1,896,100 | Ricard et al. | Feb. 7, 1933 |
| 1,908,508 | Clarke | May 9, 1933 |
| 2,028,800 | Othmer | Jan. 28, 1936 |
| 2,050,234 | Othmer | Aug. 4, 1936 |

OTHER REFERENCES

Poste "Suida Process for Acetic Acid Recovery," Industrial and Engineering Chemistry, vol. 24, pp. 722-726 (July 1932). Copy in Sci. Lib.